(12) United States Patent
Suh et al.

(10) Patent No.: US 11,564,120 B2
(45) Date of Patent: Jan. 24, 2023

(54) METHOD AND DEVICE FOR REDUCING DATA LOSS IN MOBILE COMMUNICATION SYSTEM

(71) Applicant: Samsung Electronics Co., Ltd., Suwon-si (KR)

(72) Inventors: Kyungjoo Suh, Suwon-si (KR); Sangjun Moon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 5 days.

(21) Appl. No.: 17/250,600

(22) PCT Filed: Aug. 12, 2019

(86) PCT No.: PCT/KR2019/010220
§ 371 (c)(1),
(2) Date: Feb. 8, 2021

(87) PCT Pub. No.: WO2020/032772
PCT Pub. Date: Feb. 13, 2020

(65) Prior Publication Data
US 2021/0297888 A1    Sep. 23, 2021

(30) Foreign Application Priority Data
Aug. 10, 2018    (KR) .................. 10-2018-0094011

(51) Int. Cl.
*H04W 28/02*    (2009.01)
*H04W 76/12*    (2018.01)
(Continued)

(52) U.S. Cl.
CPC ......... *H04W 28/0215* (2013.01); *H04W 8/24* (2013.01); *H04W 28/0263* (2013.01); *H04W 76/12* (2018.02); *H04W 80/10* (2013.01)

(58) Field of Classification Search
CPC .............. H04W 28/0215; H04W 8/24; H04W 28/0263; H04W 76/12; H04W 80/10; H04W 28/02; H04W 28/0252
See application file for complete search history.

(56) References Cited

U.S. PATENT DOCUMENTS

2018/0220482 A1    8/2018    Kuang
2019/0253944 A1    8/2019    Kim
2020/0344648 A1*   10/2020   Kawasaki ............. H04W 36/14

FOREIGN PATENT DOCUMENTS

KR    10-2018-0083262 A    7/2018

OTHER PUBLICATIONS

International Search Report and Written Opinion of the International Searching Authority in connection with International Application No. PCT/KR2019/010220 dated Nov. 22, 2019, 14 pages.
(Continued)

*Primary Examiner* — Kibrom T Hailu (57) ABSTRACT

A communication method performed by a user equipment (UE) in a mobile communication system, according to an embodiment, includes: transmitting, to an access and mobility management function (AMF) or a session management function (SMF), UE capability information including first information about whether or not extended session management is supported; receiving from the AMF or the SMF network capability information including second information about whether or not the extended session management is supported; and receiving, from the AMF or the SMF, a result of mapping a protocol data unit (PDU) session to an evolved packet system (EPS) bearer, performed based on the first information and the second information.

18 Claims, 3 Drawing Sheets

(51) Int. Cl.
H04W 8/24 (2009.01)
H04W 80/10 (2009.01)

(56) References Cited

OTHER PUBLICATIONS

3GPP TS 24.501 V15.0.0 (Jun. 2018), Technical Specification, 3rd Generation Partnership Project; Technical Specification Group Core Network and Terminals; Non-Access-Stratum (NAS) protocol for 5G System (5GS); Stage 3 (Release 15), Jun. 2018, 337 pages.
Ericsson, "Handling of mapped EPS QoS parameters in IWK with EPC," S2-182674, SA WG2 Temporary Document, 3GPP TSG-SA WG2 Meeting #126, Montreal, Canada, Feb. 26-Mar. 2, 2018, 8 pages.
Intel, "5GS-EPS interworking for Multi-homed IPv6 PDU Session," S2-186380 (revision of S2-18xxxx), SA WG2 Meeting #128, Jul. 2-6, 2018, Vilnius, Lithuania, 2 pages.
Nokia, "Interworking with EPS," C1-172968, 3GPP TSG-CT WG1 Meeting #105, Krakow (Poland), Aug. 21-25, 2017, 14 pages.

* cited by examiner

METHOD AND DEVICE FOR REDUCING DATA LOSS IN MOBILE COMMUNICATION SYSTEM

CROSS-REFERENCE TO RELATED APPLICATIONS

This application is a 371 National Stage of International Application No. PCT/KR2019/010220, filed Aug. 12, 2019, which claims priority to Korean Patent Application No. 10-2018-0094011, filed Aug. 10, 2018, the disclosures of which are herein incorporated by reference in their entirety.

BACKGROUND

1. Field

The disclosure relates to a method and apparatus for reducing data loss in a mobile communication system.

2. Brief Description of the Related Art

To meet the increasing demand with respect to wireless data traffic after the commercialization of $4^{th}$ generation (4G) communication systems, efforts to develop an enhanced $5^{th}$ generation (5G) communication system or a pre-5G communication system are continuing. For this reason, a 5G communication system or pre-5G communication system is called a Beyond 4G Network communication system or a post long term evolution (LTE) system. The 5G communication system defined by the $3^{rd}$ generation Partnership Project (3GPP) is called a new radio (NR) system. To achieve a high data transmission rate, the implementation of 5G communication systems in an ultra-high-frequency (mmWave) band (for example, a 60 GHz band) is being considered. To reduce path loss of radio waves and increase a transfer distance of radio waves in an ultra-high-frequency band, in 5G communication systems, technologies for beamforming, massive multiple input multiple output (massive MIMO), full dimensional MIMO (FD-MIMO), array antenna, analog beam-forming, and large-scale antenna are being discussed, and applied to the NR system. Also, to improve the network of the system, various technologies, such as advanced small cell, cloud radio access network (cloud RAN), ultra-dense networks, device to device communication (D2D), wireless backhaul, moving networks, cooperative communication, coordinated multi-points (CoMP), and interference cancellation, have been developed for 5G communication systems. In addition, other technologies, such as hybrid frequency-shift keying (FSK) and quadrature amplitude modulation (QAM) modulation (FQAM) and sliding window superposition coding (SWSC) based on advanced coding modulation (ACM), and filter bank multi carrier (FBMC), non-orthogonal multiple access (NOMA), and sparse code multiple access (SCMA) based on enhanced access technology have been developed for 5G communication systems.

Meanwhile, the Internet is evolving from a human-centered network in which humans generate and consume information to an Internet of Things (IoT) network in which distributed components such as objects transmit, receive, and process information. Internet of Everything (IoE) technology resulting from combining IoT technology with big data processing technology, etc. through a connection to a cloud server or the like is on the rise. To implement the IoT, various technical factors, such as sensing technology, wired/wireless communication, network infrastructure, service interface technology, and security technology, are required. Recently, technologies including a sensor network, machine to machine (M2M) communication, and machine type communication (MTC) for connections between objects have been studied. In an IoT environment, an intelligent Internet technology (IT) service is provided to collect and analyze data generated by connected objects to create new value for human life. The IoT may be applied to various fields, such as smart homes, smart buildings, smart cities, smart cars/connected cars, smart grids, health care, smart appliances, and advanced medical services, through convergence and combination between existing information technology (IT) and various industries.

Accordingly, various attempts to apply a 5G communication system to an IoT network are being made. For example, 5G communication, such as sensor networks, M2M communication, and MTC, is implemented by technologies, such as beam forming, MIMO, and array antenna. Applying a cloud radio access network (CRAN) as big data processing technology is also an example of the convergence of 5G technology and IoT technology.

With the development of mobile communication systems as described above, various services are being provided. Therefore, a method for effectively providing such services is required.

SUMMARY

A communication method performed by a user equipment (UE) in a mobile communication system, according to an embodiment, includes: transmitting, to an access and mobility management function (AMF) or a session management function (SMF), UE capability information including first information about whether or not extended session management is supported; receiving, from the AMF or the SMF, network capability information including second information about whether or not the extended session management is supported; and receiving, from the AMF or the SMF, a result of mapping a protocol data unit (PDU) session to an evolved packet system (EPS) bearer, performed based on the first information and the second information.

According to a disclosed embodiment, a service may be effectively provided in a mobile communication system.

DETAILED DESCRIPTION

A communication method performed by a user equipment (UE) in a mobile communication system, according to an embodiment, includes: transmitting UE capability information including first information about whether or not extended session management is supported to an access and mobility management function (AMF) or a session management function (SMF); receiving network capability information including second information about whether or not the extended session management is supported from the AMF or the SMF; and receiving a result of mapping of a protocol data unit (PDU) session to an evolved packet system (EPS) bearer, performed based on the first information and the second information, from the AMF or the SMF.

According to an embodiment, the first and second information about whether or not the extended session management is supported may include information representing whether or not extended mapping for the PDU session and the EPS bearer is supported.

According to an embodiment, the first and second information about whether or not the extended session management is supported may be indicated by a 1-bit indicator.

According to an embodiment, the result of the mapping may include the entire of the result of the mapping of the PDU session to the EPS bearer, or include information about a mapped PDU session while excluding information about a PDU session dropped without being mapped.

According to an embodiment, the communication method may further include: attaching to a mobile management entity (MME); and processing the EPS bearer according to the received result of the mapping.

According to an embodiment, the UE capability information may be transmitted to the AMF through a 5GS mobility management capability information element (5GMM capability IE) or to the SMF through a 5GS session management capability information element (5GSM capability IE).

According to an embodiment, the network capability information may be received from the AMF through a 5GS network feature support IE or from the SMF through a 5GSM network feature support IE.

A communication method performed by an access and mobility management function (AMF) in a mobile communication system, according to an embodiment, includes: receiving user equipment (UE) capability information including first information about whether or not extended session management is supported, from a UE; transmitting network capability information including second information about whether or not the extended session management is supported, to the UE; performing mapping of a PDU session to an EPS bearer based on the first information and the second information; and transmitting the result of the mapping to the UE.

According to an embodiment, the first and second information about whether or not the extended session management is supported may include information representing whether or not extended mapping for the PDU session and the EPS bearer is supported.

According to an embodiment, the communication method may further include receiving network capability information including second information about whether or not the extended session management is supported, from a session management function (SMF).

A user equipment (UE) communicating in a mobile communication system, according to an embodiment, includes: a transceiver; and a controller configured to transmit UE capability information including first information about whether or not extended session management is supported to an access and mobility management function (AMF) or a session management function (SMF), receive network capability information including second information about whether or not the extended session management is supported from the AMF or the SMF, and receive a result of mapping of a protocol data unit (PDU) session to an evolved packet system (EPS) bearer, performed based on the first information and the second information, from the AMF or the SMF.

According to an embodiment, the first and second information about whether or not the extended session management is supported may include information representing whether or not extended mapping for the PDU session and the EPS bearer is supported.

According to an embodiment, the first and second information about whether or not the extended session management is supported may be indicated by a 1-bit indicator.

According to an embodiment, the result of the mapping may include the entire of the result of the mapping of the PDU session to the EPS bearer, or may include information about a mapped PDU session while excluding information about a PDU session dropped without being mapped.

According to an embodiment, the controller may be further configured to attach to a mobile management entity (MME) and process the EPS bearer according to the received result of the mapping.

Hereinafter, embodiments of the disclosure will be described in detail with reference to the accompanying drawings.

When the embodiments are described, descriptions about technical content well known in the technical field to which the disclosure belongs and not directly related to the disclosure will be omitted. The reason for this is to more clearly convey, without obscuring, the gist of the disclosure by omitting unnecessary descriptions.

For the same reason, some components of the accompanying drawings may be exaggeratedly shown, omitted, or schematically shown. Also, the sizes of the components do not completely reflect their actual sizes. The same or corresponding components in the drawings are assigned like reference numerals.

Advantages and features of the disclosure and a method for achieving them will be clear with reference to the accompanying drawings, in which embodiments are shown. The disclosure may, however, be embodied in many different forms and should not be construed as being limited to the embodiments set forth herein; rather, these embodiments are provided so that this disclosure will be thorough and complete, and will fully convey the concept of the disclosure to those of ordinary skill in the art, and the disclosure is only defined by the scope of the claims. Like reference numerals denote like components throughout the specification.

It will be appreciated that the combinations of blocks and flowchart illustrations in the process flow diagrams may be performed by computer program instructions. These computer program instructions may be loaded into a processor of a general purpose computer, a special purpose computer, or other programmable data processing equipment, so that those instructions, which are executed through a processor of a computer or other programmable data processing equipment, create means for performing functions described in the flowchart block(s). These computer program instructions may also be stored in a computer executable or computer readable memory capable of directing a computer or other programmable data processing equipment to implement the functions in a particular manner so that the instructions stored in the computer executable or computer readable memory are also capable of producing manufacturing items containing instruction means for performing the functions described in the flowchart block(s). Computer program instructions may also be installed on a computer or other programmable data processing equipment so that a series of operating steps may be performed on a computer or other programmable data processing equipment to create a computer-executable process. Therefore, it is also possible for the instructions to operate the computer or other programmable data processing equipment to provide steps for executing the functions described in the flowchart block(s).

In addition, each block may represent a module, segment, or portion of code that includes one or more executable instructions for executing specified logical function(s). It should also be noted that in some alternative implementations, the functions mentioned in the blocks may occur out of order. For example, two blocks shown in succession may actually be executed substantially concurrently, or the blocks may sometimes be performed in reverse order according to the corresponding function.

As used herein, the terms 'portion', 'module', or 'unit' refers to a unit that can perform at least one function or operation, and may be implemented as a software or hardware component such as a Field Programmable Gate Array (FPGA) or an Application Specific Integrated Circuit (ASIC). However, the term 'portion', 'module' or 'unit' is not limited to software or hardware. The 'portion', 'module', or 'unit' may be configured in an addressable storage medium, or may be configured to run on at least one processor. Therefore, according to an embodiment of the disclosure, the 'portion', 'module', or 'unit' includes: components such as software components, object-oriented software components, class components, and task components; processes, functions, attributes, procedures, sub-routines, segments of program codes, drivers, firmware, microcodes, circuits, data, databases, data structures, tables, arrays, and variables. Functions provided in the components and 'portions', 'modules' or 'units' may be combined into a smaller number of components and 'portions', 'modules' and 'units', or sub-divided into additional components and 'portions', 'modules' or 'units'. Also, the components and 'portions', 'modules' or 'units' may be configured to run on one or more central processing units (CPUs) in a device or a security multimedia card. Also, in the embodiments, the 'portion', 'module' or 'unit' may include one or more processors.

In the following descriptions, the terms used to identify access nodes, the terms indicating network entities, the terms indicating messages, the terms indicating interfaces between network objects, the terms indicating various identification information, etc. are examples for convenience of description. Accordingly, the disclosure is not limited to these terms, and other terms having the equivalent technical meaning may be used.

Hereinafter, for convenience of description, the disclosure uses terms and names defined in standards for $5^{th}$ generation (5G), new radio (NR), or long term evolution (LTE) systems. However, the disclosure is not limited by the terms and names, and may also be applied in the same way to systems based on other standards.

The following detailed descriptions about the embodiments of the disclosure are mainly targeted to communication specifications defined by the $3^{rd}$ generation partnership project (3GPP). However, the main gist of the disclosure may also be applied to other communication systems having similar technical backgrounds through slight modifications within a range that does not greatly deviate from the scope of the disclosure, under a determination of a person having a skilled technical knowledge.

In a 5G or new radio core network (NR CN), an access and mobility management function (AMF) which is an entity managing user equipment (UE) mobility is separated from a session management function (SMF) which is an entity managing sessions. In the 5G or NR CN, because an entity managing UE mobility is separated from an entity managing sessions, unlike a mobility management entity (MME) being in charge of both UE mobility management and session management in an evolved packet core (EPC, LTE core network), a communication method and a communication management method between a UE and a network entity have also changed.

In the 5G or NR system, mobility management is performed through the AMF via a N3 interworking function (N3IWF) and session management is performed through the SMF, with respect to non 3GPP access. Also, security-related information which is an important factor in mobility management is processed through the AMF.

In data transmission, a 4G/LTE system or evolved packet system (EPS) supports up to 8 EPS bearers, whereas a 5G/NR system supports up to 15 protocol data unit (PDU) sessions. Also, a MME with improved performance, that is, a MME supporting a latest 3GPP version can support up to 15 EPS bearers even in a 4G/LTE system or EPS. Accordingly, a method for processing communication between a UE and a network to prevent data loss in interworking between MMEs and between a 4G/LTE system or EPS and a 5G/NR system is needed.

In the disclosure, a method and apparatus for preventing data loss upon data transfer between a UE and a network in interworking between a 4G/LTE system or EPS and a 5G/NR system will be described.

Figure 1:
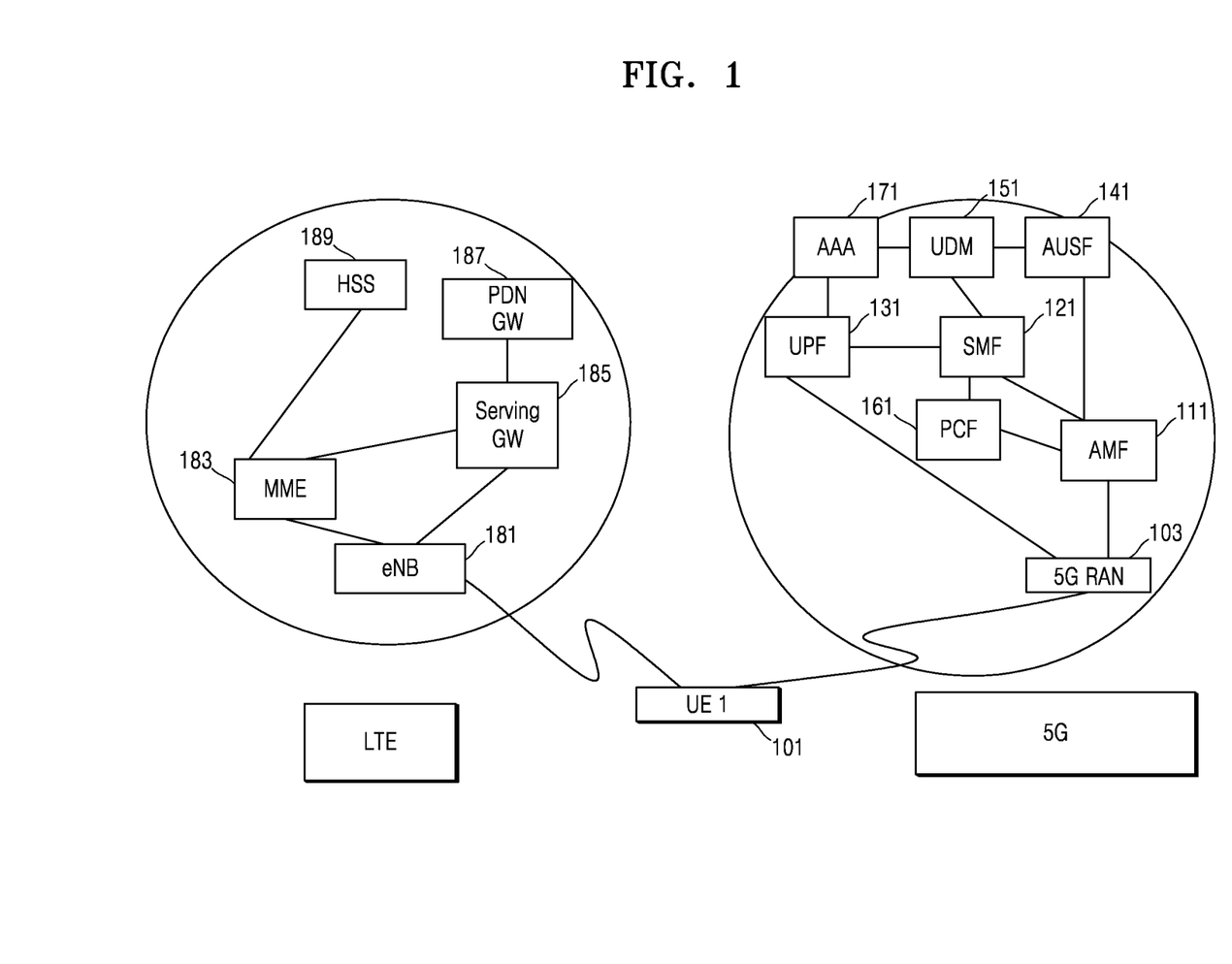
FIG. 1 illustrates a network environment to which a method for reducing data loss, according to an embodiment, is applied.

FIG. 1 illustrates a network environment to which a method for reducing data loss, according to an embodiment, is applied.

Referring to FIG. 1, a network environment according to an embodiment may include a 5G or NR system. A 5G or NR CN may include a user plane function (UPF) 131, a session management function (SMF) 121, an access and mobility management (AMF) 111, a user data management (UDM) 151, a policy control function (PCF) 161, etc., and include a 5G radio access network (RAN) 103 as an access network. Also, the 5G or NR CN may include an authentication server function (AUSF) 141 and authentication, authorization and accounting (AAA) 171 to authenticate the entities.

Meanwhile, for communication of a UE 101 through non 3GPP access, N3IWF may exist. In the case of non 3GPP access, session management may be controlled by the UE 101, non 3GPP access, N3IWF, and SMF 121, and mobility management may be controlled by the UE 101, non 3GPP access, N3IWF, and AMF 111.

Furthermore, the network environment according to an embodiment may include a 4G/LTE system or EPS. A 4G/LTE CN or EPS may include a MME 183 being in charge of mobility management and session management. The MME 183 may control communication of the UE 101.

In the disclosure, 4G/LTE and 5G/NR systems are assumed, however, embodiments of the disclosure may be also applied to other communication systems having similar technical backgrounds through slight modifications within a range that does not greatly deviate from the scope of the disclosure, under a determination of a person having a skilled technical knowledge in the technical art to which the disclosure belongs.

Figure 2:
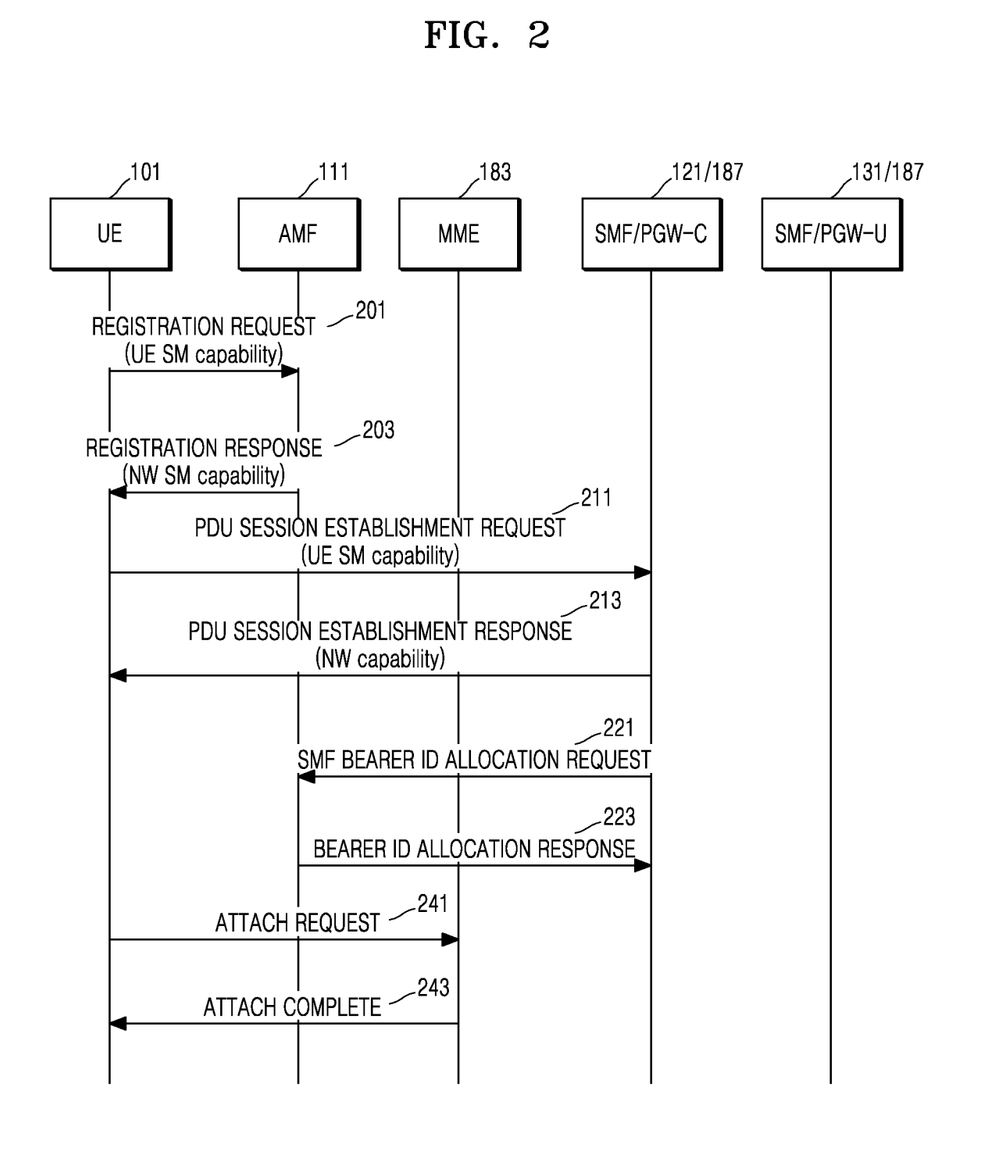
FIG. 2 is a diagram for describing a method for reducing data loss, according to an embodiment.

FIG. 2 is a diagram for describing a method for reducing data loss, according to an embodiment.

Referring to FIG. 2, in operation 201, the UE 101 may transmit an UE network capability indication to the AMF 111. The UE network capability indication may be represented by using 5GMM capability. That is, information used to represent whether there is UE network capability related to extended session management by using a 5GMM capability information element may be extended SM of [Table 1-1] below, and coding and meaning thereof is shown in [Table 1-2]. That is, the information may be used for the UE 101 to inform the network of information.

TABLE 1-1

| 8 | 7 | 6 | 5 | 4 | 3 | 2 | 1 | |
|---|---|---|---|---|---|---|---|---|
| | | | 5GMM capability IEI | | | | | octet 1 |
| | | | Length of 5GMM capability contents | | | | | octet 2 |
| 0 | 0 | 0 | 0 | 0 | Extended SM | HO | S1 attach mode | octet 3 |
| Spare | Spare | Spare | Spare | Spare | | | | |
| 0 | 0 | 0 | 0 | 0 | 0 | 0 | 0 | octet 4*-15* |
| | | | Spare | | | | | |

TABLE 1-2

Extended SM (octet 3, bit 3)

| | |
|---|---|
| 0 | Extended mapping of PDU session and EPS bearer not supported |
| 1 | Extended mapping of PDU session and EPS bearer supported |

All other bits in octet 3 to 15 are spare and shall be coded as zero, if the respective octet is included in the information element.

In operation 203, the AMF 111 may transmit a parameter informing network capability to the UE 101. The parameter may inform the UE 101 of information about AMF network capability by using a 5GS network feature support information element. The AMF network capability may transfer information through an extended SM supported parameter of the 5GS network feature support information element, as shown in [Table 2-1] below, and coding and meaning thereof is shown in [Table 2-2].

TABLE 2-1

| 8 | 7 | 6 | 5 | 4 | 3 | 2 | 1 | |
|---|---|---|---|---|---|---|---|---|
| | | | 5GS network feature support IEI | | | | | octet 1 |
| | | Length of 5GS network feature support contents | | | | | | octet 2 |
| MPSI | IWK N26 | EMF | | EMC | | | IMS VoPS | octet 3 |
| 0 | 0 | 0 | 0 | 0 | Extended SM supported | | | Octet 4 |
| 0 | 0 | 0 | 0 | 0 | 0 | 0 | 0 | octet 5*-5* |
| | | | Spare | | | | | |

TABLE 2-2

Extended SM supported (octet 4, bit 1)

| | |
|---|---|
| 0 | Extended mapping of PDU session and EPS bearer not supported |
| 1 | Extended mapping of PDU session and EPS bearer supported |

All bits in octets 4 except above indicated to 5 are spare and shall be coded as zero, if the respective octet is included in the information element.

In operation 211, the UE 101 may transfer a PDU session establishment request. At this time, the UE 101 may transmit information about capability of the UE 101 to the SMF 121.

TABLE 3-1

| 8 | 7 | 6 | 5 | 4 | 3 | 2 | 1 | |
|---|---|---|---|---|---|---|---|---|
| | | | 5GSM capability IEI | | | | | octet 1 |
| | | | Length of 5GSM capability contents | | | | | octet 2 |
| 0 | 0 | 0 | 0 | 0 | Extended SM map | MH6-PDU | RqoS | octet 3 |
| Spare | Spare | Spare | Spare | Spare | | | | |
| 0 | 0 | 0 | 0 | 0 | 0 | 0 | 0 | octet 4*-15* |
| | | | Spare | | | | | |

TABLE 3-2

5GSM capability value
Extended SM map (octet 3, bit 3)

| | |
|---|---|
| 0 | Extended mapping of PDU session and EPS bearer not supported |
| 1 | Extended mapping of PDU session and EPS bearer supported |

All other bits in octet 3 to 15 are spare and shall be coded as zero, if the respective octet is included in the information element.

In operation 213, the SMF 121 may transmit a PDU session establishment response to the UE 101. At this time, the SMF 121 may transmit information about network capability to the UE 101.

TABLE 4-1

| 8 | 7 | 6 | 5 | 4 | 3 | 2 | 1 | |
|---|---|---|---|---|---|---|---|---|
| | | | 5GS SM network feature support IEI | | | | | octet 1 |
| | | Length of 5GS SM network feature support contents | | | | | | octet 2 |
| 0 | 0 | 0 | 0 | 0 | 0 | 0 | NW Extended SM Map | octet 3 |
| Spare | Spare | Spare | Spare | Spare | Spare | Spare | | |
| 0 | 0 | 0 | 0 | 0 | 0 | 0 | 0 | octet 4*-15* |
| | | | Spare | | | | | |

TABLE 4-2

5GS SM network feature support value
NW Extended SM map (octet 3, bit 1)

| | |
|---|---|
| 0 | Extended mapping of PDU session and EPS bearer not supported |
| 1 | Extended mapping of PDU session and EPS bearer supported |

All other bits in octet 3 to 15 are spare and shall be coded as zero, if the respective octet is included in the information element.

In operation 221, the SMF 121 may transmit an EPS bearer ID allocation request to the AMF 111. According to an embodiment, the SMF 121 may inform the AMF 111 of EPS bearer ID mapping-related capability and a PDU session of the SMF 121 so that the AMF 111 can transfer the above-described capability to the UE 101. According to another embodiment, as in operation 211, the SMF 121 may inform the UE 101 of the EPS bearer ID mapping-related capability and the PDU session of the SMF 121 in a process of establishing a PDU session with the UE 101.

The AMF 111 which has received the EPS bearer ID allocation request may perform EPS bearer ID allocation and transmit an EPS bearer ID allocation response to the SMF 121, in operation 223. The process may be because a default bearer and a dedicated bearer are separate from each other in a 4G/LTE system so that a bearer to be configured as both a guaranteed bit rate (GBR) bearer and a default bearer needs to be determined.

Meanwhile, the AMF 111 may support up to 15 PDU sessions, and the MME 183 may support up to 8 EPS bearers, or up to 15 EPS bearers in the case of a new system.

A network which has received an indication from the UE 101 may also need to inform the UE 101 of the number of PDU sessions or EPS bearers that the network can support. For example, the network may need to inform the UE 101 of whether the network can support up to 15 PDU sessions or 15 EPS bearers. According to another embodiment, upon interworking between a 4G/LTE system or EPS and a 5G/NR system, the network may need to inform the UE 101 of information about capability related to mapping of a 5G PDU session to a 4G EPS bearer. That is, the network may inform the UE 101 of information about whether to drop due to a failure of EPS bearer mapping or whether the network has capability of mapping a plurality of PDU sessions to EPS bearers for EPS bearer mapping.

Also, upon mapping of the PDU sessions to the EPS bearers, the UE 101 and the network may need to be synchronized and operate in regard of which bearer is configured as a default bearer, which bearers are grouped to map QoS together, or which bearers are to be dropped. Accordingly, as described above, the capabilities of the UE 101 and the network may be informed to each other, and according to the capabilities, the AMF 111 may select a default bearer and map the default bearer.

According to an embodiment, some bearers may need to be configured as dedicated bearers, and therefore, the SMF 121 may perform QoS mapping, grouping, and EPS bearer ID allocation. That is, the bearers configured as dedicated bearers may need to be mapped by the SMF 121. In this case, in the SMF 121 and the UE 101, the corresponding information may need to be synchronized. Accordingly, for information synchronization in the SMF 121 and the UE 101, information may be transferred from the SMF 121 to the UE 101 via the AMF 111.

According to an embodiment, the AMF 111 or SMF 121 may map several EPS bearers to one PDU session. At this time, the AMF 111 or SMF 121 may group and map bearers according to QoS flows having similar properties, for example, high reliability, requiring high data rates, etc. Also, the AMF 111 or SMF 121 may perform mapping in order of high priority or high reliability.

According to an embodiment, the AMF 111 or SMF 121 may map one PDU session to one EPS bearer, and inform the UE 101 that the other(s) has been dropped. In this case, the UE 101 may recognize that the remaining PDU session(s) except for the mapped PDU session has been dropped.

According to an embodiment, the AMF 111 or SMF 121 may map one EPS bearer to one PDU session and then finish the procedure. In this case, there may be a PDU session not mapped to any EPS bearer.

In operation 241, the UE 101 may transmit an attach request to the MME 183, and the MME 183 which has received the attach request may transmit attach complete to the UE 101 in operation 243.

The UE 101 may operate according to capability of the UE 101 and network capability information received from the network, as follows.

According to an embodiment, the AMF 111 or SMF 121 may map several EPS bearers to one PDU session, and accordingly, the UE 101 may map the several EPS bearers to the PDU session to maintain the EPS bearers.

According to an embodiment, the AMF 111 or SMF 121 may map one EPS bearer to one PDU session, and inform the UE 101 that the other(s) has been dropped. Accordingly, the UE 101 may recognize that the remaining PDU session(s) except for the mapped PDU session has been dropped, and process the PDU session not dropped.

According to an embodiment, the AMF 111 or SMF 121 may map one EPS bearer to one PDU session. In this case, there may be a PDU session not mapped to any EPS bearer. At this time, the UE 101 may process a bearer not dropped. Meanwhile, because the AMF 111 or SMF 121 does not transfer information about the dropped EPS session to the UE 101, the UE 101 cannot know which PDU session has been dropped.

Figure 3:
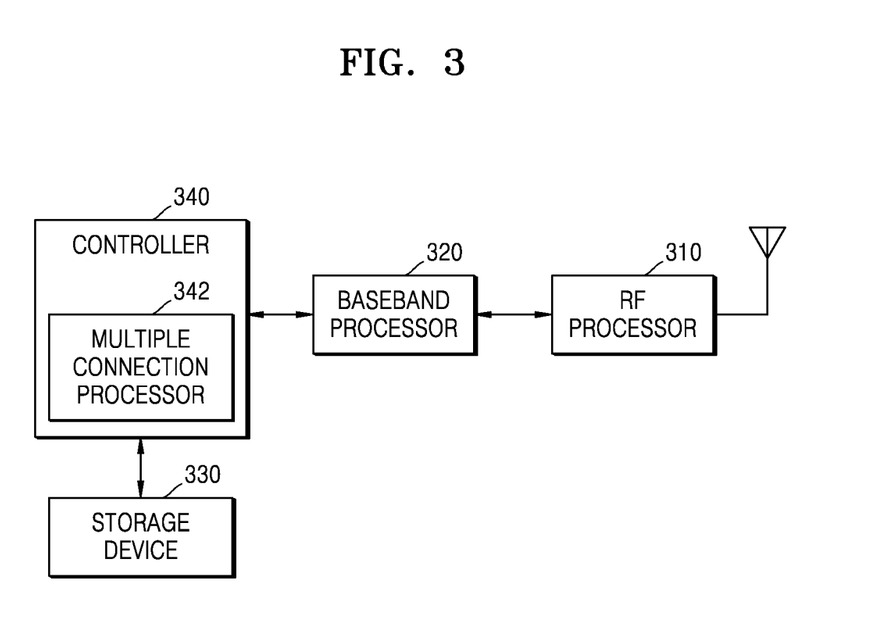
FIG. 3 is a block diagram illustrating a structure of a user equipment (UE) according to an embodiment.

FIG. 3 is a block diagram illustrating a structure of a UE according to an embodiment.

Referring to FIG. 3, the UE may include a radio frequency (RF) processor 310, a baseband processor 320, a storage device 330, and a controller 340.

The RF processor 310 may perform a function for transmitting/receiving signals through a wireless channel, such as band conversion, amplification, etc. of the signals. That is, the RF processor 310 may up-convert a baseband signal provided from the baseband processor 320 into an RF band signal, transmit the RF band signal through an antenna, and down-convert an RF band signal received through the antenna into a baseband signal. For example, the RF processor 310 may include a transmitter filter, a receiver filter, an amplifier, a mixer, an oscillator, a digital to analog convertor (DAC), an analog to digital convertor (ADC), etc. In FIG. 19, a single antenna is shown, however, the UE may include a plurality of antennas. Also, the RF processor 310 may include a plurality of RF chains. Furthermore, the RF processor 310 may perform beamforming. For beamforming, the RF processor 310 may adjust phases and magnitudes of signals that are transmitted/received through a plurality of antennas or antenna elements. Also, the RF processor 310 may perform multiple input multiple output (MIMO), and receive several layers when performing a MIMO operation.

The baseband processor 320 may perform a function of conversion between a baseband signal and a bit stream according to a physical layer specification of a system. For example, upon data transmission, the baseband processor 320 may encode and modulate a transmission bit stream to generate complex symbols. Also, upon data reception, the baseband processor 320 may demodulate and decode a baseband signal provided from the RF processor 310 to restore a reception bit steam. For example, according to an orthogonal frequency division multiplexing (OFDM) method, upon data transmission, the baseband processor 320 may encode and modulate a transmission bit stream to generate complex symbols, map the complex symbols to subcarriers, and then configure OFDM symbols through an inverse fast Fourier transform (IFFT) operation and cyclic prefix (CP) insertion. Also, upon data reception, the baseband processor 320 may segment a baseband signal provided from the RF processor 310 in unit of OFDM symbols, restore signals mapped to subcarriers through a fast Fourier transform (FFT) operation, and then restore a reception bit stream through demodulation and decoding.

The baseband processor 320 and the RF processor 310 may transmit and receive signals as described above. Accordingly, the baseband processor 320 and the RF processor 310 may be referred to as a transmitter, a receiver, a transceiver, or a communicator. Furthermore, at least one of the baseband processor 320 and the RF processor 310 may include a plurality of communication modules to support a plurality of different radio access technologies. Also, at least one of the baseband processor 320 and the RF processor 310 may include different communication modules to process signals of different frequency bands. For example, the different radio access technologies may include a wireless local area network (WLAN) (for example, IEEE 802.11), a cellular network (for example, LTE), etc. Also, the different frequency bands may include a super high frequency (SHF) (for example, 2.NRHz, NRhz) band and a millimeter (mm) wave (for example, 60 GHz) band.

The storage device 330 may store data, such as a basic program, an application program, setting information, etc., for operations of the UE. Also, the storage device 330 may provide the stored data according to a request from the controller 340.

The controller 340 may control overall operations of the UE. For example, the controller 340 may transmit and receive signals through the baseband processor 320 and the RF processor 310. Also, the controller 340 may record data in the storage device 330 and read data from the storage device 330. For this, the controller 340 may include at least one processor. For example, the controller 340 may include a communication processor (CP) that performs a control for communication and an application processor (AP) that controls an upper layer such as an application program.

The methods according to the embodiments of the disclosure described in claims or specification thereof may be implemented in hardware, software, or a combination of hardware and software.

When the methods are implemented in software, a computer-readable storage medium or a computer program product storing at least one program (software module) may be provided. The at least one program stored in the computer-readable storage medium or the computer program product may be configured for execution by at least one processor within an electronic device. The at least one program may include instructions that cause the electronic device to execute the methods according to the embodiments of the disclosure described in the claims or specification thereof.

The program (software module or software) may be stored in random access memory (RAM), a non-volatile memory including a flash memory, read only memory (ROM), an electrically erasable programmable ROM (EE-PROM), a magnetic disc storage device, compact disc-ROM (CD-ROM), digital versatile discs (DVDs) or other types of optical storage devices, and a magnetic cassette. Alternatively, the program may be stored in a memory that is configured as a combination of some or all of the memories. A plurality of such memories may be provided.

Furthermore, the program may be stored in an attachable storage device that may be accessed through a communication network, such as the Internet, Intranet, a local area network (LAN), a wide LAN (WLAN), or a storage area network (SAN), or a communication network configured in a combination thereof. The storage device may access a device performing the embodiments of the disclosure through an external port. Further, a separate storage device on the communication network may also access the device performing the embodiments of the disclosure.

In the above-described embodiments of the disclosure, a component included in the disclosure is expressed in a singular or plural form depending on the described embodiments of the disclosure. However, singular or plural expressions are selected to be suitable for the presented situations for convenience of description, and the disclosure is not limited to the singular or plural form. A component expressed in a plural form may be configured as a single component, or a component expressed in a singular form may be configured as a plurality of components.

Meanwhile, the embodiments of the disclosure disclosed in the present specification and the drawings are specific examples intended to easily describe the technical content of the disclosure and help understanding the disclosure, not intended to limit the scope of the disclosure. That is, it is apparent to those skilled in the art that other modified examples based on the technical spirit of the disclosure may be executed. Also, the embodiments may be combined and used as needed. For example, some parts of the embodiments of the disclosure may be combined. Further, other modified examples based on the technical idea of the above-described embodiments may be executable in other systems, for example, LTE systems and 5G/NR systems.

The invention claimed is:

1. A method performed by a user equipment (UE) in a wireless communication system, the method comprising:
transmitting, to an access and mobility management function (AMF), UE capability information including first information indicating whether extended session management is supported;
receiving, from the AMF, network capability information including second information indicating whether the extended session management is supported; and
in case that supports of extended session management at the UE and the AMF are identified based on the first information and the second information, receiving, from the AMF, mapping information between a protocol data unit (PDU) session and at least one evolved packet system (EPS) bearer, wherein the mapping information is determined based on the network capability information including at least one of a number of supported PDU sessions, a number of supported EPS bearers, or a number of supported EPS bearers per the PDU session.

2. The method of claim 1, wherein the first information and the second information include, respectively, information indicating whether an extended mapping for the PDU session and the EPS bearer is supported.

3. The method of claim 1, wherein the first information and the second information include a one-bit indicator indicating whether the extended session management is supported.

4. The method of claim 1, wherein the mapping information includes the mapped PDU session information between the PDU session and the EPS bearer, or includes mapped PDU session information between the PDU session and the EPS bearer and dropped PDU session information that is not mapped between the PDU session and the EPS bearer.

5. The method of claim 1, further comprising:
transmit an attach request for performing attachment operation to a mobile management entity (MME); and
processing the EPS bearer based on the received mapping information.

6. The method of claim 1, further comprising transmitting the UE capability information to the AMF through a 5th generation system (5GS) mobility management capability information element (5GMM capability IE).

7. The method of claim 1, further comprising receiving the network capability information from the AMF through a 5GS network feature support IE.

8. A method performed by an access and mobility management function (AMF) in a wireless communication system, the method comprising:
receiving, from a user equipment (UE), UE capability information including first information indicating whether extended session management is supported;
transmitting, to the UE, network capability information including second information indicating whether the extended session management is supported;
in case that supports of extended session management at the UE and the AMF are identified based on the first information and the second information, identifying mapping information between a protocol data unit (PDU) session and at least one evolved packet system (EPS) bearer, wherein the mapping information is determined based on the network capability information including at least one of a number of supported PDU sessions, a number of supported EPS bearers, or a number of supported EPS bearers per the PDU session; and
transmitting, to the UE, the mapping information.

9. The method of claim 8, wherein the first information and the second information include, respectively, information indicating whether an extended mapping between the PDU session and the EPS bearer is supported.

10. The method of claim 8, further comprising receiving, from a session management function (SMF), network capability information including second information indicating whether the extended session management is supported.

11. A user equipment (UE) communicating in a wireless communication system, the UE comprising:
a transceiver; and
a controller operably coupled to the transceiver, the controller configured to:
transmit, to an access and mobility management function (AMF), UE capability information including first information indicating whether extended session management is supported,
receive, from the AMF, network capability information including second information indicating whether the extended session management is supported, and
in case that supports of extended session management at the UE and the AMF are identified based on the first information and the second information, receive, from the AMF, mapping information between a protocol data unit (PDU) session and at least one evolved packet system (EPS) bearer, wherein the mapping information is determined based on the network capability information including at least one of a number of supported PDU sessions, a number of supported EPS bearers, or a number of supported EPS bearers per the PDU session.

12. The UE of claim 11, wherein the first information and the second information include, respectively, information indicating whether an extended mapping between the PDU session and the EPS bearer is supported.

13. The UE of claim 11, wherein the first information and the second information include a one-bit indicator indicating whether the extended session management is supported.

14. The UE of claim 11, wherein the mapping information includes mapped PDU session information between the PDU session and the EPS bearer, or includes mapped PDU session information between the PDU session and the EPS bearer and dropped PDU session information that is not mapped between the PDU session and the EPS bearer.

15. The UE of claim 11, wherein the controller is further configured to transmit an attach request for performing attachment operation to a mobile management entity (MME) and process the EPS bearer based on the received mapping information.

16. An access and mobility management function (AMF) in a wireless communication system, the AMF comprising:
a transceiver; and
a controller operably coupled to the transceiver, the controller configured to:
receive, from a user equipment (UE), UE capability information including first information indicating whether extended session management is supported,
transmit, to the UE, network capability information including second information indicating whether the extended session management is supported,
in case that supports of extended session management at the UE and the AMF are identified based on the first information and the second information, identify mapping information between a protocol data unit (PDU) session and at least one evolved packet system (EPS) bearer, wherein the mapping information is determined based on the network capability information including at least one of a number of supported PDU sessions, a number of supported EPS bearers, or a number of supported EPS bearers per the PDU session, and
transmit, to the UE, the mapping information.

17. The AMF of claim 16, wherein the first information and the second information include, respectively, information indicating whether an extended mapping between the PDU session and the EPS bearer is supported.

18. The AMF of claim 16, wherein the controller is further configured to receive, from a session management function (SMF), network capability information including second information indicating whether the extended session management is supported.

* * * * *